United States Patent
Yamada et al.

(10) Patent No.: US 10,055,676 B2
(45) Date of Patent: Aug. 21, 2018

(54) IMAGE FORMING APPARATUS WITH PRINT MODES, THE PRINT MODES COMPRISING PRINTING BASED ON DETECTION OF A LOCATION ON A PRINT MEDIUM AND PRINTING NOT BASED ON DETECTION OF A LOCATION ON A PRINT MEDIUM

(71) Applicant: Seiko Epson Corporation, Tokyo (JP)

(72) Inventors: Yusuke Yamada, Matsumoto (JP); Katsuhiko Sugiyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 56 days.

(21) Appl. No.: 15/222,436

(22) Filed: Jul. 28, 2016

(65) Prior Publication Data
US 2017/0039459 A1 Feb. 9, 2017

(30) Foreign Application Priority Data
Aug. 6, 2015 (JP) ................. 2015-155766

(51) Int. Cl.
G06K 15/02 (2006.01)
(52) U.S. Cl.
CPC ....... G06K 15/1885 (2013.01); G06K 15/022 (2013.01); G06K 15/024 (2013.01)
(58) Field of Classification Search
CPC . G06K 15/1885; G06K 15/024; G06K 15/022
USPC ............................. 358/1.15, 1.18
See application file for complete search history.

(56) References Cited

U.S. PATENT DOCUMENTS

| 7,172,122 B2 | 2/2007 | Alleshouse |
| 9,132,674 B2 | 9/2015 | Nagaoka |
| 2009/0211712 A1* | 8/2009 | Siedlaczek ................ B65C 9/18 156/387 |

FOREIGN PATENT DOCUMENTS

| JP | 10-040035 A | 2/1998 |
| JP | 2005-513627 A | 5/2005 |
| JP | 2009-234101 A | 10/2009 |
| JP | 2013-156710 A | 8/2013 |
| JP | 2014-213462 A | 11/2014 |
| JP | 2014-213544 A | 11/2014 |
| JP | 2015-66719 A | 4/2015 |

* cited by examiner

*Primary Examiner* — Eric A Rust
(74) *Attorney, Agent, or Firm* — Foley & Lardner LLP

(57) ABSTRACT

The user can configure the print layout intuitively, and prevent needlessly executing a compensation process based on the printer mode. A plug-in 22 that controls a printer 3 that prints to a target print area in each unit print area disposed in the conveyance direction of a continuous print medium has: a mode selector 51 that determines if the printer 3 prints based detecting each unit print area of the print medium; a layout acquisition unit 53b that acquires first layout information representing the location of the target print area in the unit print area; and a layout generator 54b that generates second layout information which differs from the first layout information in the conveyance direction of the print medium when the printer determines to print based on the position detection.

6 Claims, 13 Drawing Sheets

IMAGE FORMING APPARATUS WITH PRINT MODES, THE PRINT MODES COMPRISING PRINTING BASED ON DETECTION OF A LOCATION ON A PRINT MEDIUM AND PRINTING NOT BASED ON DETECTION OF A LOCATION ON A PRINT MEDIUM

BACKGROUND

1. Technical Field

The present invention relates to a control method of a printer including a process of adjusting the printing position of the print data, and further relates to a program and a recording medium.

2. Related Art

JP-A-2013-156710 describes related technology. More specifically, JP-A-2013-156710 discloses technology for determining the model of printer, paper size, and paper orientation, and adjusting the point of origin for printing the print data based on the results. As a result, this configuration can produce the desired printout even when the point of origin used by the client terminal (the printer driver that generates the print data) differs from the point of origin used by the printer.

Some printers can also be used with multiple types of print media by changing a mode setting. For example, receipt printers that can be used with both continuous paper (print media used for producing receipts), and label roll paper (print media having labels affixed at an even interval to a liner), are known from the literature. When operating in a mode that uses label roll paper, the printer prints on each label triggered by detecting the leading end of each label. As a result, the point of origin (referred to below as they-coordinate origin) in the conveyance direction of the print medium is the leading edge of the label. When used to print on continuous paper, however, there is no need to detect a position in the conveyance direction of the print medium (no need to detect the leading end of a label).

If the print layout on the client terminal is referenced to the point of origin P (y-coordinate origin) of the printer when in the mode using label roll paper, the coordinate system of the print data will be as shown in FIG. 11. In FIG. 11, reference numeral 5 indicates the label roll paper, reference numeral 6 indicates the liner, and reference numeral 7 indicates the label. Reference numeral E1 indicates the unit print area, E2 indicates the label area, and E3 indicates the target print area.

For example, if the target print area E3 is set centered in the label area E2 when setting up the layout of the target print area E3 relative to the unit print area E1 on the client terminal, the length of the top margin UM and the bottom margin DM must be set differently as shown in the figure. Because the top margin UM and the bottom margin DM must be different lengths in order to desirably center the target print area E3 in the label area E2, setting equal top and bottom margins is difficult and the margin settings are unintuitive for the user. In other words, to center the target print area E3 in the label area E2, it would be more user friendly to move the point of origin P so that the top margin UM and the bottom margin DM can be set to the same length as shown in FIG. 12.

However, if the coordinate system shown in FIG. 12 is used, compensation is required for the offset position in the conveyance direction of the print medium. In other words, when using the printer in a mode that uses label roll paper, a process that compensates for the offset position is required to enable the user to adjust the print layout intuitively. When used in the continuous paper mode, however, there is no need to detect a position in the conveyance direction of the print medium, and a process that compensates for an offset position is not required. Switching between applying a compensation process or not according to the operating mode of the printer is therefore desirable, but technology enabling the same is not found in the literature.

SUMMARY

The invention relates to a printer that enables the user to intuitively adjust the print layout while preventing unnecessarily executing an offset position compensation process appropriately to the operating mode of the printer, and further relates to a program and a recording medium.

A control method of a printer configured to print to a target print area contained in a unit print area in the conveyance direction of a continuous print medium based on print data for the unit print area, is a control method including: a mode determination step in which the printer identifies and determines whether or not to print to the unit print area based on a detection of the print medium; and an acquisition step of acquiring first layout information that is contained in the print data and describes the location of the target print area relative to the unit print area; generating second layout information that differs from the first layout information in the location of the target print area to the unit print area in the conveyance direction of the print medium, and printing based on the second layout information, if the printer determines to print based on the detection in the mode determination step; and printing based on the first layout information if the printer determines in the mode determination step to not print based on the detection.

Because a printer according to the invention detects the print medium, determines the unit print area, and changes from first layout information to second layout information when printing, the user can configure the print layout intuitively even if point of origin for printing in the conveyance direction of the print medium differs on the client terminal (that generates the first layout information) used by the user to set the print layout, and the printer that prints based on the second layout information. Furthermore, because the printer is configured to print based on the first layout information when not in a specific mode, needless layout generating processes can be prevented.

These steps may be executed by an external device that can communicate with the printer, or by the printer itself.

In a control method of a printer according to another aspect of the invention, the printer is a printer that prints on label paper having labels disposed at a specific position in the unit print area; the label gap, which is the length of the space in the conveyance direction between adjacent labels, is acquired; and the second layout information is generated by changing from the first layout information the location of the target print area to the unit print area in the conveyance direction based on the acquired label gap.

Thus comprised, based on the label gap, the location of the target print area to the unit print area in the conveyance direction can be set desirably.

In a control method of a printer according to another aspect of the invention, when the leading end of the unit print area on the first direction side of the conveyance direction, and the leading end of the label area on the first direction side, are coincident: the target print area is inside the area of the label; and the second layout information is generated by changing the position in the conveyance direction of the target print area to the unit print area ½ the label gap to the first direction side in the conveyance direction from the first layout information.

Thus comprised, labels can be reliably printed with good alignment because the position is adjusted appropriately to the deviation between the location of the label in the unit print area, and the location of the target print area in the area of the label.

In the control method of a printer according to another aspect of the invention, the first layout information and the second layout information include a first margin length, which is the distance between the leading end of the unit print area and the leading end of the target print area, on the first direction side in the conveyance direction; and the first margin length contained in the generated second layout information is shorter than the first margin length contained in the first layout information.

Thus comprised, if paper slippage is less than the shortened length of the margin, the printing process can be desirably executed in the next unit print area without fault. In other words, label waste from paper slippage can be eliminated. The length of the unit print area in the conveyance direction can also be shortened without changing the target print area at the detected position.

In the control method of a printer according to another aspect of the invention, the leading end of the unit print area and the leading end of the target print area on the first direction side are the same in the second layout information.

Thus comprised, because layout information having a length equal to the gap between labels deleting is generated as the second layout information, and printing is based on the second layout information, label waste from paper slippage can be prevented without affecting printing in the label area.

Another aspect of the invention is a computer-readable recording medium recording a program controlling a printer configured to print to a target print area contained in a unit print area in the conveyance direction of a continuous print medium based on print data for the unit print area, the program comprising: a mode determination step in which the printer identifies and determines whether or not to print to the unit print area based on a detection of the print medium; and an acquisition step of acquiring first layout information that is contained in the print data and describes the location of the target print area relative to the unit print area; generating second layout information that differs from the first layout information in the location of the target print area to the unit print area in the conveyance direction of the print medium, and printing based on the second layout information, if the printer determines to print based on the detection in the mode determination step; and printing based on the first layout information if the printer determines in the mode determination step to not print based on the detection.

Another aspect of the invention is a printer including: a conveyance unit configured to convey a continuous recording medium; a printhead configured to print on the conveyed print medium; a detection unit configured to detect the conveyed print medium; and a control unit configured to receive print data corresponding to a unit print area disposed in the conveyance direction, control the printhead based on the received print data, and print to a target print area contained in the unit print area; the control unit executing a step of acquiring first layout information that is contained in the print data and describes the location of the target print area relative to the unit print area; and determining whether or not to determine the unit print area based on detection by the detection unit when printing; generating second layout information that differs from the first layout information in the location of the target print area to the unit print area in the conveyance direction of the print medium, and printing based on the generated second layout information, if the unit print area is determined based on the detection when printing the print data; and printing based on the first layout information if it is determined when printing the print data to not identify the unit print area based on the detection.

By using the recording medium according to the invention, a control method of a printer that enables the user to configure the print layout intuitively, and can prevent needless position correction processes according to the printer mode, can be provided.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 3 is a block diagram illustrating the functional configuration of a plug-in.

DESCRIPTION OF EMBODIMENTS

Embodiment 1

A control method of a printer, a program, and a recording medium according to the invention are described below with reference to the accompanying figures. In this embodiment, the control method (program) of a printer according to the invention is embodied by a plug-in 22 in a print manager module 20 of a print management server 2.

Figure 1:
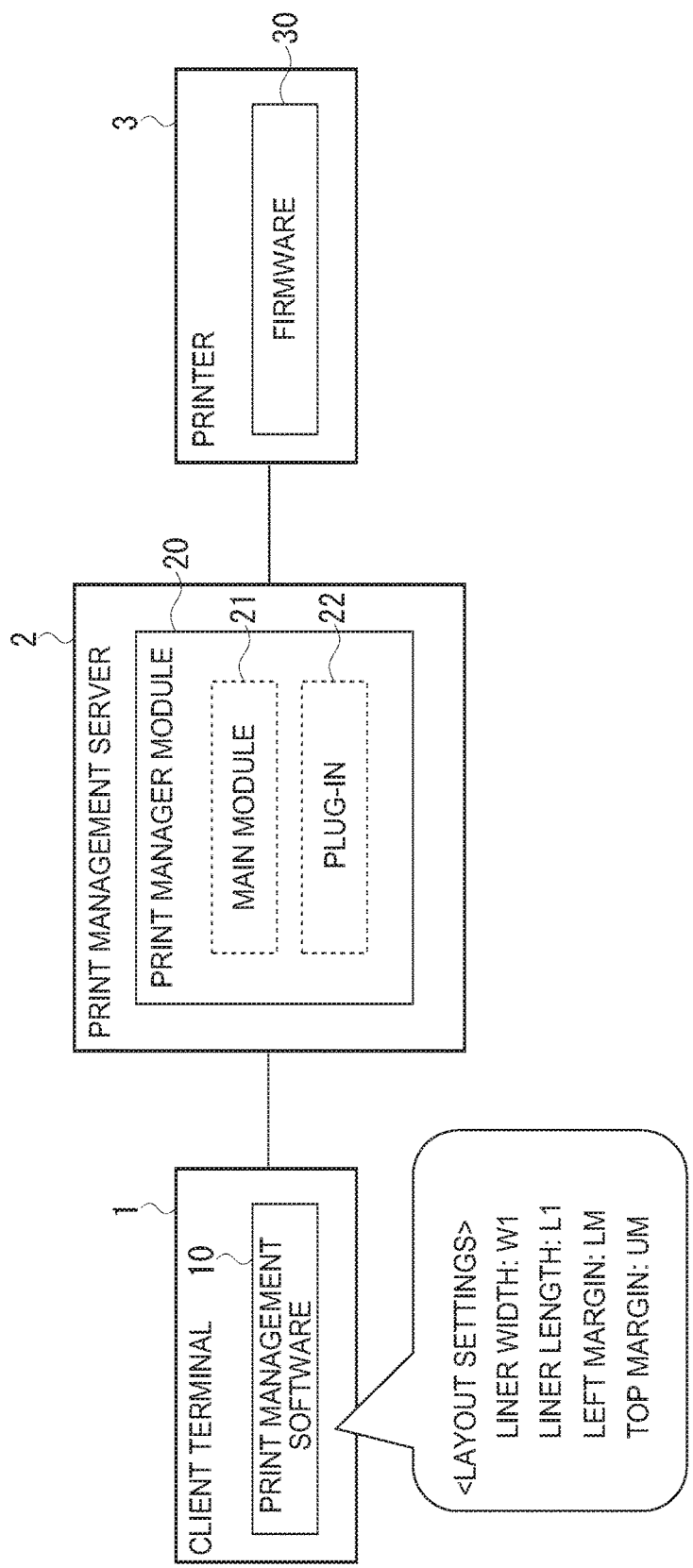
FIG. 1 is a block diagram illustrating the configuration of a printing system.

FIG. 1 illustrates the system configuration of a printing system SY according to an embodiment of the invention. The printing system SY includes a client terminal 1, print management server 2, and printer 3. The client terminal 1 and the print management server 2 are communicatively connected, and the print management server 2 and the printer 3 are communicatively connected. Note that wireless or wired connections may be used. The client terminal 1, print management server 2, and printer 3 may also be connected through the Internet or other network. Yet further, there may be multiple client terminals 1 and multiple printers 3 in the printing system SY.

The print management server 2 handles data conversion processes between the client terminal 1 and the print management server 2, and is the core of the printing system SY. The print data includes image data (including data representing drawing or not drawing each pixel, and color information about the color of each pixel) for rendering images in the unit print area E1 (see FIG. 11) described below, and layout information expressing the layout of images formed in the unit print area E1.

The print management server 2 is a server provided to easily and smoothly execute specific business processes, such as managing barcode information for printing labels. The print management server 2 has a print manager module 20 including a main module 21 and plug-in 22. The main module 21 handles specific printing processes such as editing barcode information. The plug-in 22 is provided by the vendor (manufacturer) of the print management server 2, and processes the print data output from the main module 21 appropriately to the printer 3. In other words, the main module 21 in the print manager module 20 applies a fixed printing process that is independent of the printer 3 targeted for printing, and the plug-in 22 then applies a different printing process specific to the printer 3 targeted for printing. By converting (editing) layout information with the plug-in 22, this embodiment of the invention makes it easier for the user to configure the layout on the client terminal 1 when using label roll paper 5 (see FIG. 11) in the printer 3 of an existing system (while utilizing functions of the main module 21). This is described in further detail below.

Figure 12:
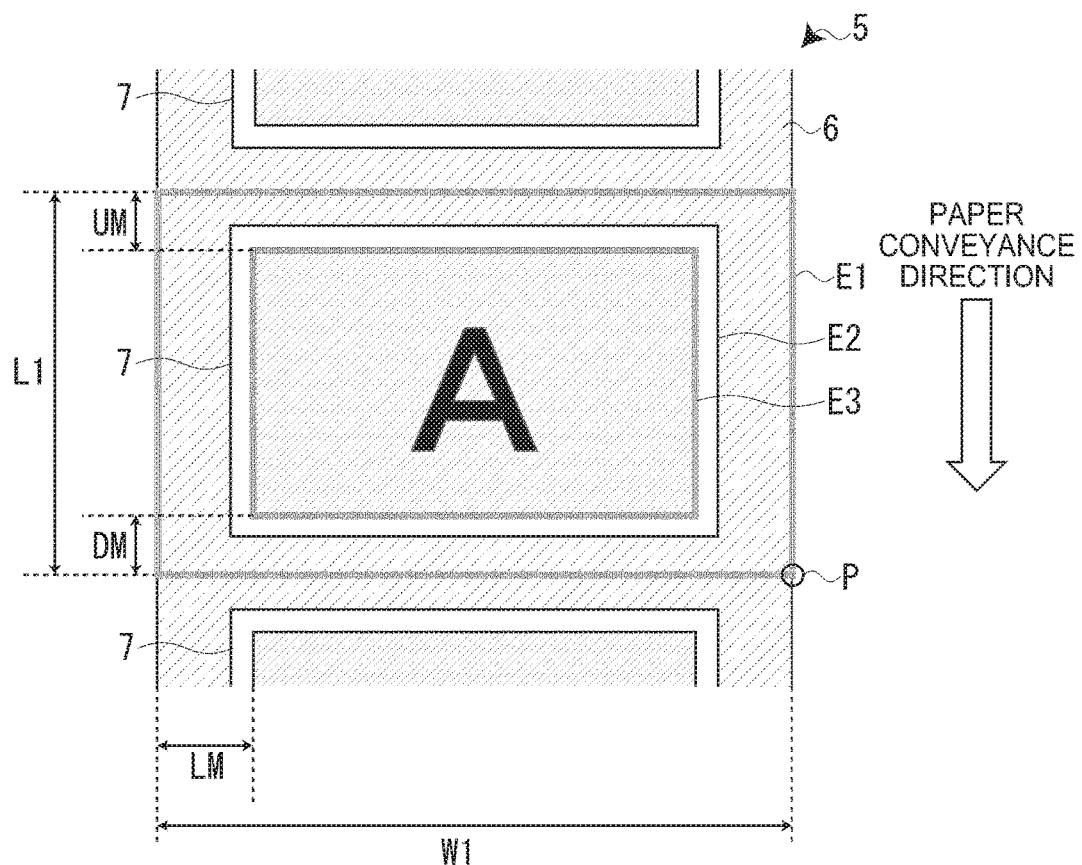
FIG. 12 illustrates the print data coordinate system on the client terminal.

Print management software 10 compatible with the print management server 2 is installed on the client terminal 1, and the user uses this print management software 10 to configure the layout of the print data. FIG. 12 illustrates the print data coordinate system used on the client terminal 1 in this embodiment of the invention. Shown in the figure are the unit print area E1, the label area E2 (the area occupied by a label 7), and the target print area E3 (the area in the label where image data is printed). There are four parameters that can be defined when setting the layout on the client terminal 1 (print management software 10): liner width W1, liner length L1, left margin LM, and top margin UM (see FIG. 1).

The liner width W1 is the length across the width of the unit print area E1 (the direction perpendicular to the conveyance direction of the label roll paper 5). The liner length L1 is the length of the unit print area E1 in the media conveyance direction. The unit print areas E1 are formed with no gap therebetween in the media conveyance direction. The left margin LM is the length across the width of the white space between the left edge of the unit print area E1 and the left edge of the target print area E3. The top margin UM is the length of the white space in the top margin between the top edge of the unit print area E1 (the trailing end in the media conveyance direction) and the top edge of the target print area E3 (the trailing end in the media conveyance direction).

Note that while not specifically shown in the figures, the client terminal 1 is configured similarly to a common information processing device (personal computer or tablet computer, for example), and has input means for inputting information, display means for displaying information, memory means for storing information, communication means, and control means, for example.

The printer 3 has firmware 30, and executes printing processes according to the firmware 30. The printer 3 also changes the operating mode according to the type of print media used. The printer 3 according to this embodiment anticipates a receipt printer that prints on continuous paper (roll paper), and can change between a first mode for printing on continuous paper not shown (print media used for producing receipts), and a second mode (specific mode) for printing on label roll paper 5 (print media having labels 7 affixed to the liner 6 at an equal interval).

Figure 11:
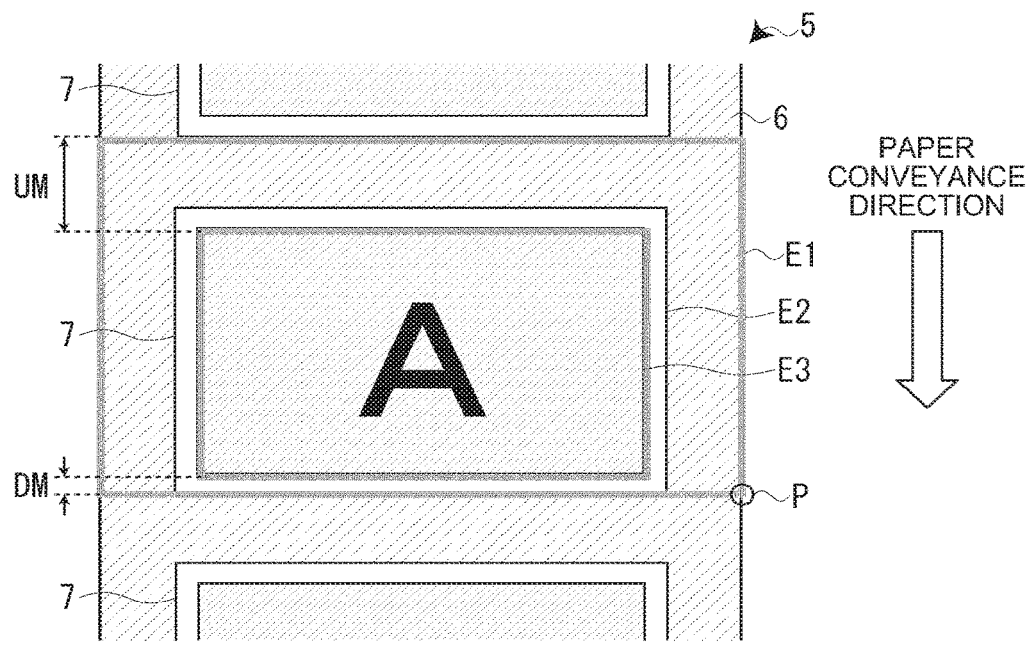
FIG. 11 illustrates the print data coordinate system in the printer.

When set to the second mode, the printer 3 detects the leading end of each label, and based on the result determines the location of the unit print area E1. The printer 3 also renders the print data in the identified unit print area E1 to print each label 7. As a result, the point of origin P (y-coordinate origin) in the media conveyance direction is the leading edge of the label 7. FIG. 11 illustrates the print data coordinate system of the printer 3. As shown in the figure, the point of origin P in the print data coordinate system of the printer 3 is shifted upstream in the conveyance direction from the print data coordinate system of the client terminal 1 (see FIG. 12). The plug-in 22 of the embodiment compensates for this shift by converting the layout information.

The hardware configuration of the printer 3 is described next with reference to FIG. 2. The printer 3 has memory 31, a communication means 32, a print mechanism 33, and a controller 34. The memory 31 stores firmware 30. The communication means 32 communicates with the print management server 2 and receives print data. The controller 34 includes a CPU (central processing unit), ROM (read-only memory), and RAM (random access memory), and controls the printer 3.

The print mechanism 33 includes a label sensor 41 for detecting the leading end of a label 7; a printhead 42 for printing on the print medium (continuous paper or label roll paper 5); a paper conveyance mechanism 43 for conveying the print medium; and a cutter mechanism 44 for cutting the print medium. The label sensor 41 may be a transmissive sensor or a reflective sensor. A combination of transmissive and reflective sensors may also be used to more accurately detect the leading end of each label.

The functional configuration of the plug-in 22 is described next with reference to FIG. 3. The plug-in 22 includes a mode selector 51, label gap acquisition unit 52, print data acquisition unit 53, print data generator 54, and print data output unit 55.

The mode selector 51 determines if the printer 3 to which the print data is to be output is set to the second mode for printing triggered by detecting the leading end of a label 7 (detecting the leading end of the unit print area E1). If the first mode is not included in the printing operations of the printer 3 to which the print data is addressed, the second mode is determined to be set, and the first mode is determined to be set if the second mode is not included. The label gap acquisition unit 52 acquires the label gap G1 (a desired length setting), which is the length in the media conveyance direction between adjacent labels 7 on the label roll paper 5 (liner 6). Note that the mode of the printer 3 and the label gap G1 are set using the configuration tool 60. The configuration tool 60 is provided as part of the print manager module 20. When the print management server 2 is a web server, the configuration tool 60 can be used from an external device using a web browser.

The print data acquisition unit 53 acquires print data from the main module 21, and includes an image data acquisition unit 53*a* that acquires the image data to be printed, and a layout acquisition unit 53b that acquires the layout information, from the acquired print data. Note that the print data (image data and layout information) acquired by the print data acquisition unit 53 is referred to below as first print data (first image data and first layout information). The first layout information denotes the location of the target print area E3 relative to the unit print area E1. More specifically, the first layout information includes the layout settings from the client terminal 1, that is, the liner width W1, liner length L1, left margin LM, and top margin UM (see FIG. 1). These layout settings are thus included in the first print data, which is the print data sent from the client terminal 1 to the print management server 2 and the print data passed from the main module 21 to the plug-in 22.

The print data generator 54 generates second print data based on the first print data, and includes an image data generator 54a for generating the second image data, and a layout generator 54b for generating the second layout information. When the mode selector 51 determines the printer 3 is set to the second mode, the layout generator 54b generates second layout information, which is different from the first layout information in the location of the target print area E3 relative to the unit print area E1 in the paper conveyance direction. If the printer 3 is not set to the second mode, the first layout information is used as the second layout information.

Figure 4:
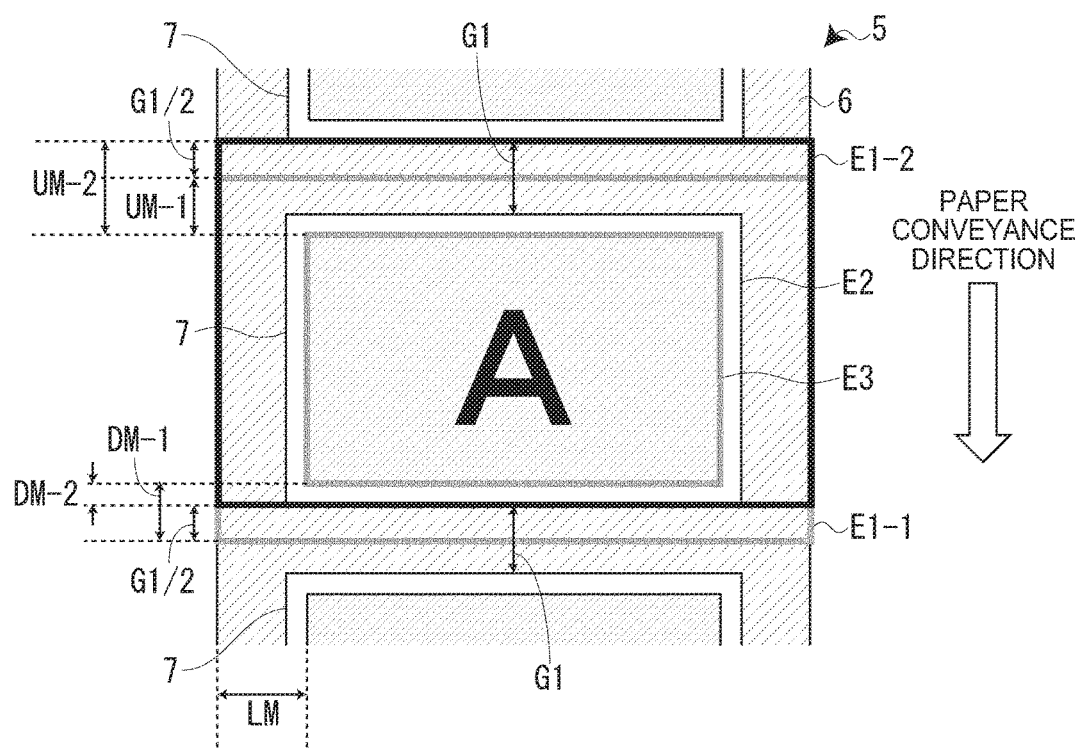
FIG. 4 illustrates the layout generating process in a first embodiment of the invention.

As shown in FIG. 4, the first layout information represents the location of the target print area E3 relative to the unit print area E1-1 (indicated by the gray frame line in FIG. 4, the location of the target print area E3 relative to the unit print area E1 in FIG. 12). The second layout information represents the location of the target print area E3 relative to the unit print area E1-2 (indicated by the black frame line in FIG. 4, the location of the target print area E3 relative to the unit print area E1 in FIG. 11). Based on the label gap G1 acquired by the label gap acquisition unit 52, the layout generator 54b determines the amount of adjustment from the first layout information to the second layout information. More specifically, as shown in FIG. 4, layout generator 54b generates the second layout information by moving the location in the paper conveyance direction of the target print area E3 relative to the unit print area E1-1 distance G1/2 downstream in the paper conveyance direction from the location in the first layout information. As a result, the top margin UM is changed from UM-1 to UM-2 (UM-1+G1/2), and changing the bottom margin DM from DM-1 to DM-2 (DM-1−G1/2).

If the mode selector 51 determines the printer 3 is set to the second mode, the image data generator 54a applies a coordinate data conversion process (a y-coordinate conversion process in this example) in conjunction with the layout generator 54b changing the layout. If the printer 3 is not set to the second mode, the first image data is used as the second image data.

The print data output unit 55 outputs the print data generated by the print data generator 54 to the printer 3, and includes an image data output unit 55a that outputs the second image data, and a layout output unit 55b that outputs the second layout information.

The configuration of the plug-in 22 causes the printer 3 to print based on the second print data (second layout information) when set to the second mode. When set to the first mode (a mode other than the second mode), the printer 3 prints based on the first print data (first layout information).

Figure 5:
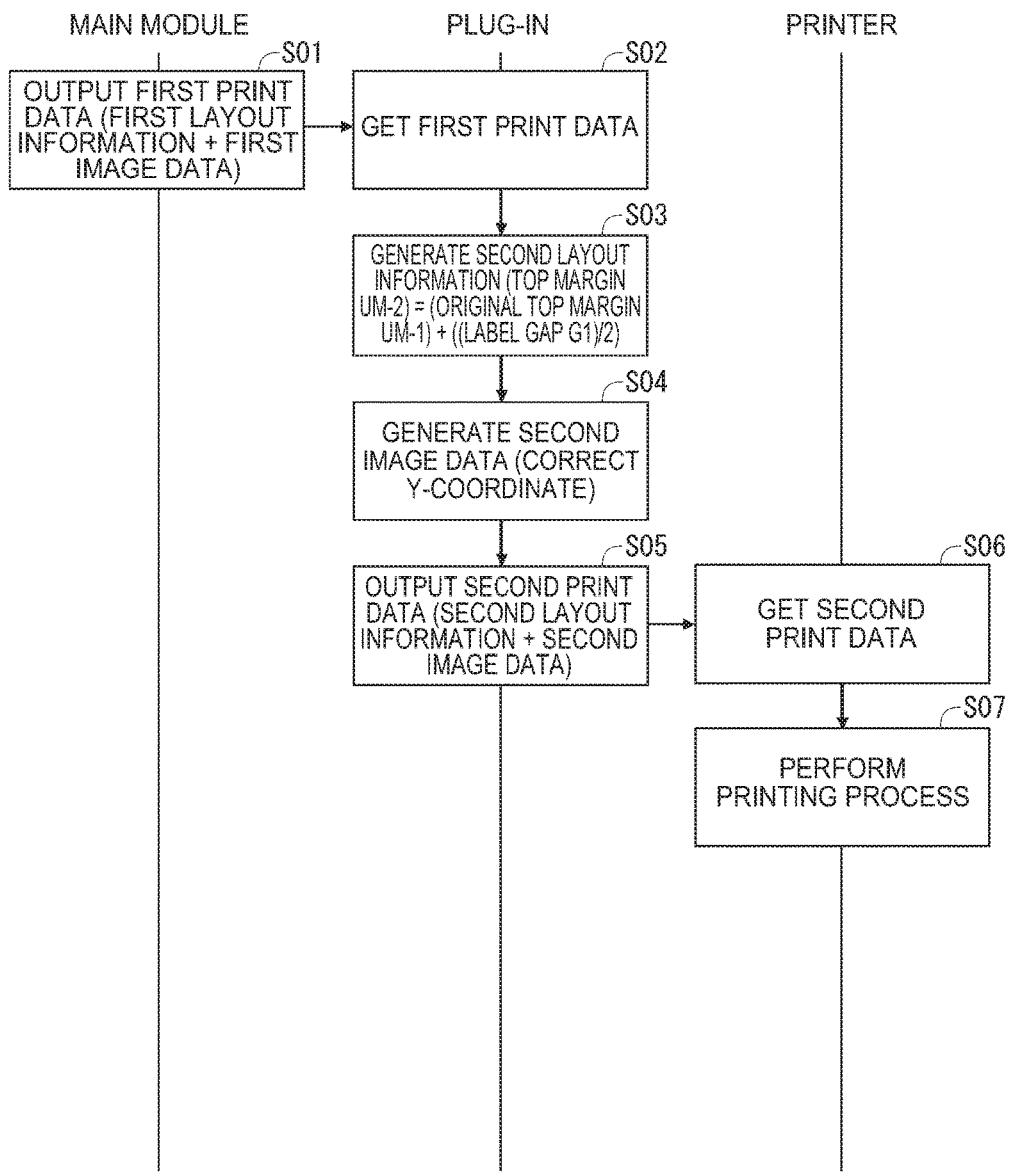
FIG. 5 is a flow chart showing the flow of a printing process according to a first embodiment of the invention.

The flow of the printing process in the first embodiment of the invention is described next with reference to the flow chart in FIG. 5. In this example, the printer 3 is set to the second mode. First, the main module 21 outputs the first print data (first layout information and first image data) to the plug-in 22 (S01), and the plug-in 22 thereby acquires this information (S02). Based on the acquired first layout information and the set label gap G1, the plug-in 22 corrects the top margin UM based on an equation not shown, and generates the second layout information (S03). The plug-in 22 then corrects the y-coordinate of the first image data appropriately to the adjustment of the top margin UM (offset amount) and generates the second image data (S04). Next, the plug-in 22 outputs the second print data including the generated second layout information and second image data to the printer 3 (S05). The printer 3 thus acquires the second print data (S06), and prints to the label roll paper 5 (S07).

As described above, the plug-in 22 according to the first embodiment determines if the printer 3 is set to the second mode, and if the printer 3 is set to the second mode, generates second layout information with a different top margin UM than the first layout information that was acquired. As a result, because the user can adjust the print layout using a coordinate system (the coordinate system shown in FIG. 12) that is more convenient for designing the print layout than the coordinate system of the printer 3 (FIG. 11), and can therefore easily and intuitively set equal top and bottom margins. In other words, even when the points of origin of the coordinate systems of the client terminal 1 and the printer 3 differ, a coordinate system that is easy for the user to understand can be used. If the printer 3 is not set to the second mode, the plug-in 22 uses the first layout information without modification as the second layout information, and therefore prevents needlessly executing the layout generating process.

Furthermore, because the label gap G1 can be set, the printing position can be shifted an amount (label gap G1/2) appropriate to the location of the labels 7 on the liner 6, and desirably positioned labels can be printed reliably without requiring a print test.

The invention is not limited to the embodiment described above, and can be varied in many ways as shown in the following examples.

Example 1

Figure 6:
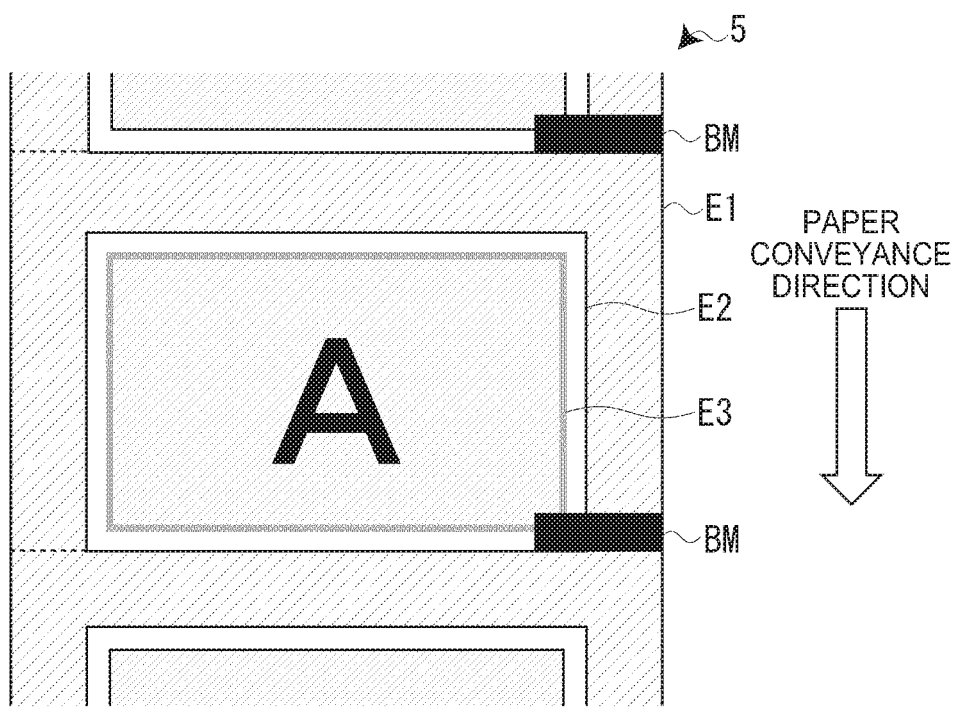
FIG. 6 shows an example of label roll paper with black marks in a variation of the invention.

The first embodiment of the invention detects the leading end of the label 7 as the leading end of the unit print area E1, but the location of black marks BM as shown in FIG. 6 may be detected. A black mark BM is disposed at the leading end of the unit print area E1 in the paper conveyance direction. This embodiment of the invention enables using label roll paper 5 with pre-printed black marks BM.

Example 2

The print management server 2 (plug-in 22) executes the print data generating process in the embodiment described above, but this process may execute on the printer 3 side. In this case, the steps in the control method of a printer according to the invention may be executed by the firmware 30 of the printer 3, or by a removable interface board installed in the printer 3, or by an external device other than the print management server 2 that can communicate with the printer 3.

Example 3

The coordinate system of the print data in the foregoing first embodiment describes an example in which the unit print areas E1 are disposed at an equal interval with no gap therebetween in the paper conveyance direction, but the invention can also be applied when there is a gap between individual unit print areas E1 (when there is a buffer between print data blocks), and when the unit print areas E1 are not disposed at a uniform interval in the paper conveyance direction.

Example 4

The print data coordinate system of the printer 3 in the foregoing first embodiment describes an example in which the leading edge of each unit print area E1 in the paper conveyance direction is coincident with the leading edge of each label area E2 (unit print area E1-2 in FIG. 4), but this embodiment of the invention can also be applied when the trailing end of the unit print area E1 in the paper conveyance direction is coincident with the trailing end of the label area E2. In other words, the invention can also be used when the leading end of each unit print area E1 and the leading end of each label area E2 are coincident in the reverse conveyance direction (first direction). In this configuration, the layout generator 54b generates the second layout information by moving the position of the target print area E3 relative to the unit print area E1 in the conveyance direction 1/2 of label gap G1 in the reverse conveyance direction (first direction) from the position in the first layout information.

Embodiment 2

A second embodiment of the invention is described next with reference to FIG. 7 and FIG. 8. In the first embodiment, the layout generator 54b generates second layout information with a different top margin UM than the first layout information. This embodiment of the invention applies a process that deletes part of the top margin UM. This resolves problems that may occur when a conveyance problem, such as the paper slipping, occurs.

Figure 13:
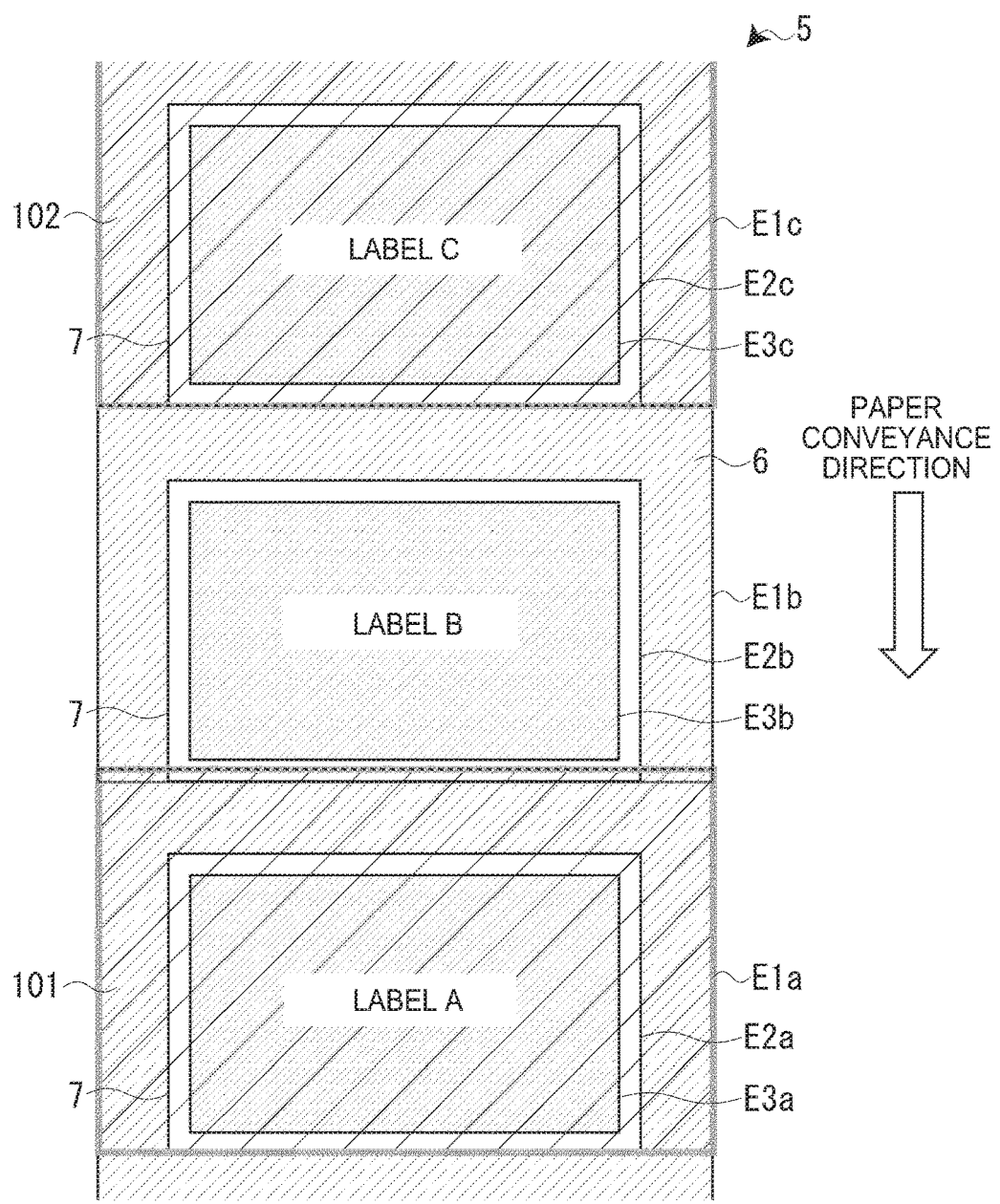
FIG. 13 shows an example of the printout when the paper slips.

For example, as shown in FIG. 13, when the paper slips, for example, and the leading end of label B is detected before the process of printing (indicated by shading 101 in the figure) to the unit print area E1 where label A is printed ends, the leading end of label B is discarded and the next printing process (indicating by shading 102) starts triggered by detecting the leading end of label C. This results in a label 7 (label B in the example in the figure) that is mostly blank, and the label 7 being wasted. To resolve this problem, the plug-in 22 in this embodiment of the invention converts the layout (deletes the top margin UM). The differences with the first embodiment are described below. Note that like parts are identified by like reference numerals in this embodiment and the first embodiment, and detailed description thereof is omitted. Examples of changes applied to identical parts in the first embodiment are also applicable to this embodiment.

Figure 2:
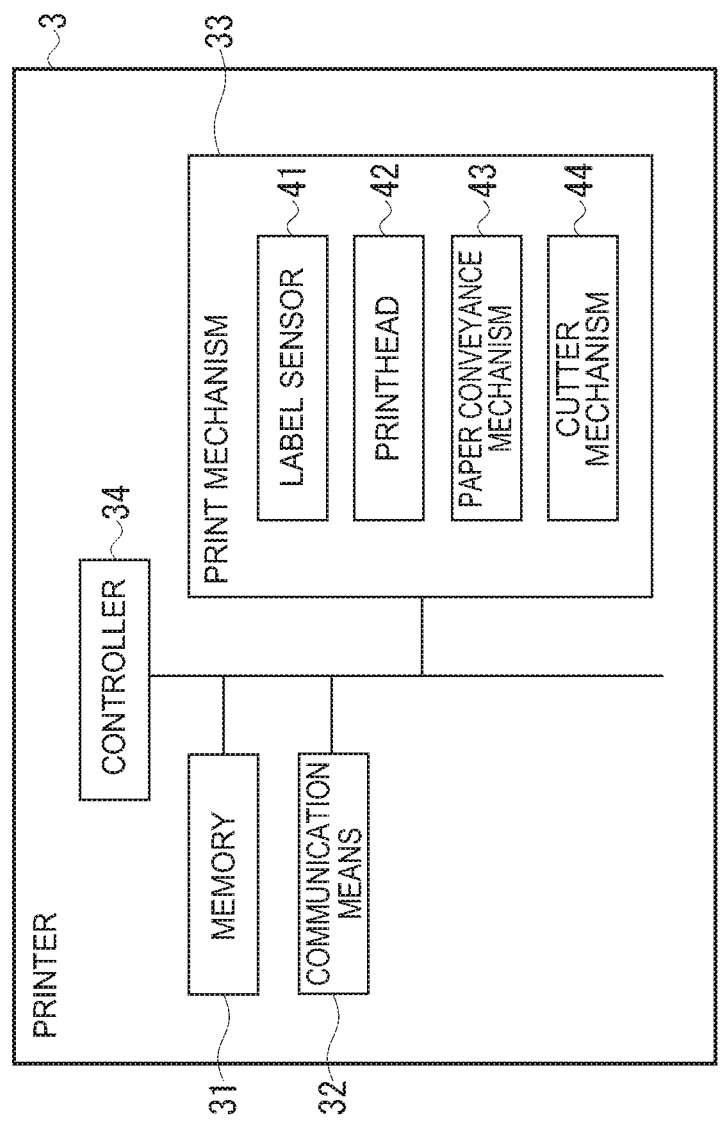
FIG. 2 is a block diagram illustrating the hardware configuration of the printer.
Figure 3:
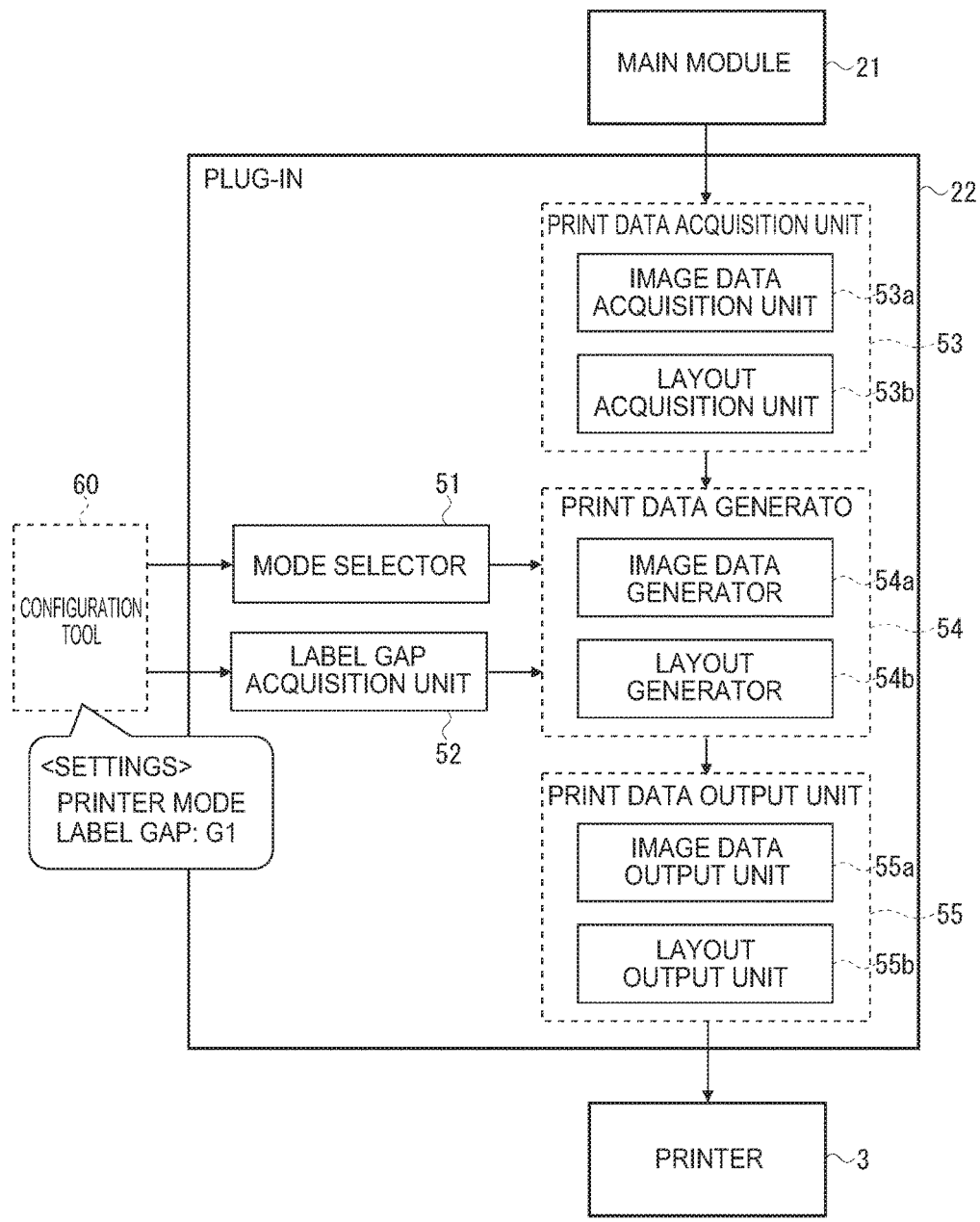

The system configuration, the hardware configuration of the printer 3, and the functional configuration of the plug-in 22 in this embodiment are identical to the first embodiment (see FIG. 1, FIG. 2, FIG. 3). However, when the mode selector 51 determines the printer 3 is set to the second mode in this embodiment, the layout generator 54b generates second layout information that is shorter in the paper conveyance direction of the unit print area E1 than in the first layout information. More specifically, a portion of the top margin (trailing end margin) equal to the length of the gap between labels 7 (the portion outside the label area E2). Note that the top margin as used here means the white space in the paper conveyance direction between the trailing end of the unit print area E1 and the trailing end of the target print area E3.

Figure 7:
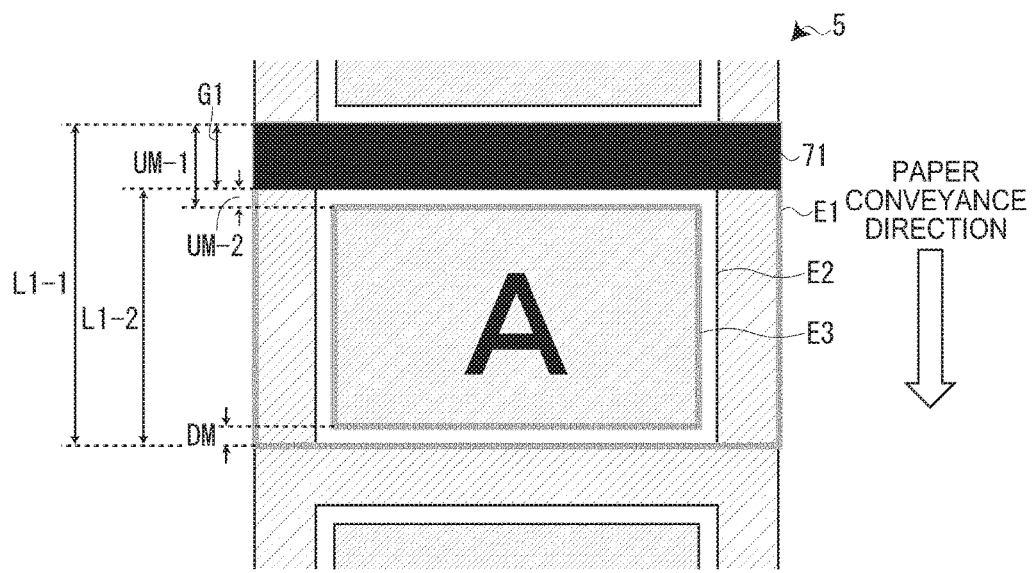
FIG. 7 illustrates the layout generating process in a second embodiment of the invention.

FIG. 7 illustrates the layout generating process in the second embodiment of the invention. Unlike the first embodiment, this embodiment of the invention is based on the client terminal 1 adjusting the print layout according to the coordinate system of the printer 3. In other words, the same coordinate system is used for the leading end of the unit print area E1 and the leading end of the label area E2 in the paper conveyance direction. As shown in the figure, the layout generator 54b generates the second layout information by deleting the black portion 71 from the unit print area E1. The length of this black portion 71 in the paper conveyance direction is the length of the label gap G1 from the trailing end of one label area E2 to the trailing end of the next label area E2. The top margin UM of the second layout information is therefore label gap G1 shorter than in the first layout information, and the liner length L1 is therefore also label gap G1 shorter.

Figure 8:
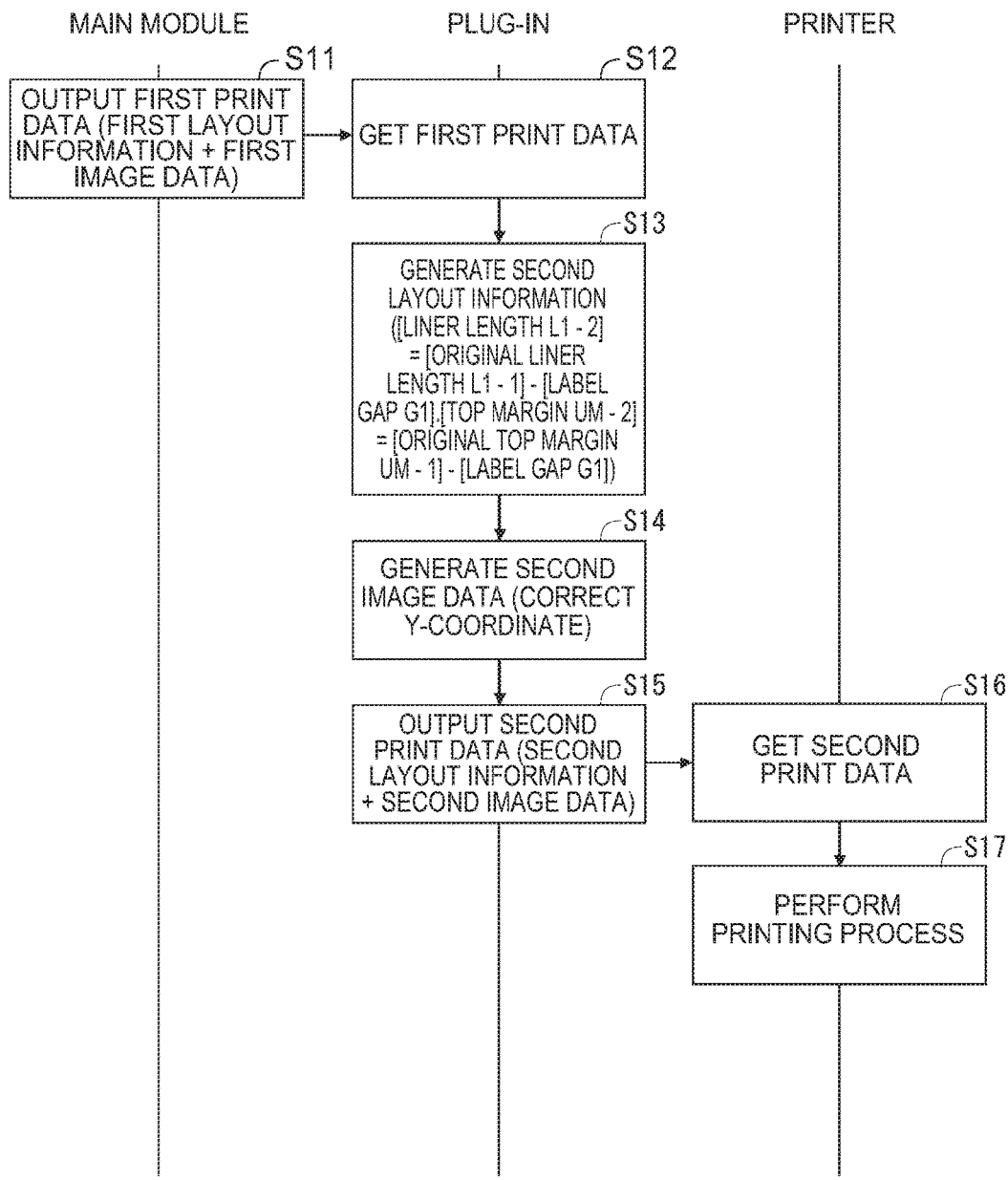
FIG. 8 is a flow chart showing the flow of a printing process according to a second embodiment of the invention.

FIG. 8 is a flow chart showing the flow of the printing process in this second embodiment of the invention. Steps S11, S12, S15-S17 are identical to steps S01, S02, S05-S07 of the first embodiment shown in FIG. 5, and further description thereof is omitted. As shown in S13, the plug-in 22 generates the second layout information by correcting the liner length L1 and top margin UM by an equation not shown based on the acquired first layout information and the set label gap G1. As shown in S14, the plug-in 22 also corrects the y-coordinate of the first image data appropriately to the correction of the liner length L1 and top margin UM, and generates the second image data.

As described above, the plug-in 22 of the second embodiment determines if the printer 3 is set to the second mode, and if the second mode is set, generates first layout information by deleting a portion of the top margin UM from the acquired first layout information. If the paper slips an amount less than or equal to the deleted length (label gap G1), the next unit print area E1 can be successfully printed and a label 7 is not wasted. If the printer 3 is not in the second mode, the plug-in 22 uses the first layout information directly as the second layout information, and executing a layout generating process needlessly can be prevented.

Furthermore, because the plug-in 22 deletes a portion equal to the gap between labels 7, problems resulting from paper slipping can be resolved without affecting label 7 printing. Furthermore, because only the top margin is deleted and the bottom margin (leading margin) is not, processing is simple, and because the deleted area is outside the label area E2, the deletion process can be reliably prevented from affecting the target print area E3.

The invention is not limited to the embodiment described above, and can be varied in many ways as shown in the following examples.

Example 1

The second embodiment deletes all of an amount equal to the gap between labels 7 in the paper conveyance direction from the top margin, but may delete only part of this amount. The length of the deleted portion may also be fixed or set desirably using the configuration tool 60. In another example, all of the top margin and/or bottom margin may also be omitted.

Example 2

Further alternatively, the ends (top end and bottom end) of the unit print area E1 in the paper conveyance direction may be deleted regardless of whether they correspond to the top margin and bottom margin (white space). Further alternatively, either one of top end and bottom end of the unit print area E1 in the paper conveyance direction may be deleted. The length of the deleted portion may also be fixed or set desirably using the configuration tool 60.

Example 3

As in example 3 of the first embodiment described above, there may also be a gap between each of the unit print areas E1 in the second embodiment. The second embodiment is more effective, however, with a narrow gap between adjacent unit print areas E1.

Embodiment 3

A third embodiment of the invention is described next with reference to FIG. 9 and FIG. 10. This embodiment is a combination of the first embodiment and the second embodiment. In other words, the second embodiment is based on the client terminal 1 configuring the print layout using the coordinate system of the printer 3 (FIG. 7), but this embodiment assumes configuring the print layout using a more user-friendly coordinate system (FIG. 12) as in the first embodiment. The differences with the second embodiment are described below. Note that like parts are identified by like reference numerals in this embodiment and the first and second embodiments, and detailed description thereof is omitted. Examples of modifications of identical parts in the first and second embodiments are also applicable to this embodiment.

When the mode selector 51 determines the printer 3 is set to the second mode, the layout generator 54*b* in this embodiment deletes a portion equal to the length of the label 7 gap from the top (trailing) margin and the bottom (leading) margin. Note that the top margin is the white space between the trailing end of the unit print area E1 and the trailing end of the target print area E3 in the paper conveyance direction. The bottom margin is the white space between the leading end of the unit print area E1 and the leading end of the target print area E3 in the paper conveyance direction.

Figure 9:
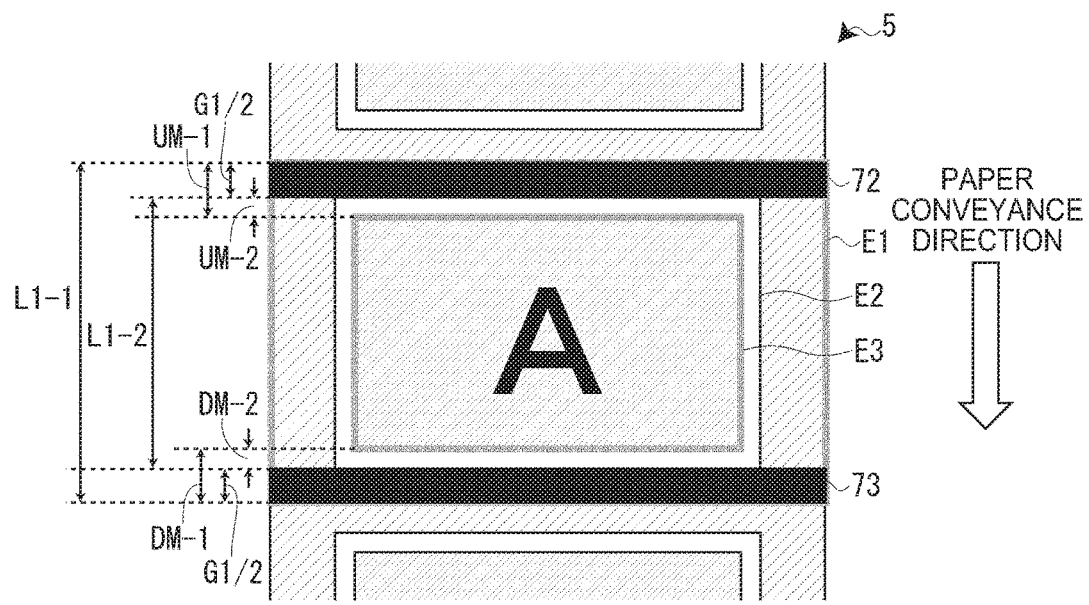
FIG. 9 illustrates the layout generating process in a third embodiment of the invention.

FIG. 9 illustrates the layout generating process in the third embodiment of the invention. When the target print area E3 is centered in the label area E2 in this embodiment, a coordinate system with a top margin UM and bottom margin DM that are the same length is used. As shown in the figure, the layout generator 54*b* generates the second layout information by deleting the black portions 72, 73 from the unit print area E1. Th length of these black portions 72, 73 in the conveyance direction is label gap G1/2. The top margin UM and bottom margin DM are therefore label gap G1/2 shorter, and the liner length L1 is therefore label gap G1 shorter, in the second layout information than in the first layout information.

Figure 10:
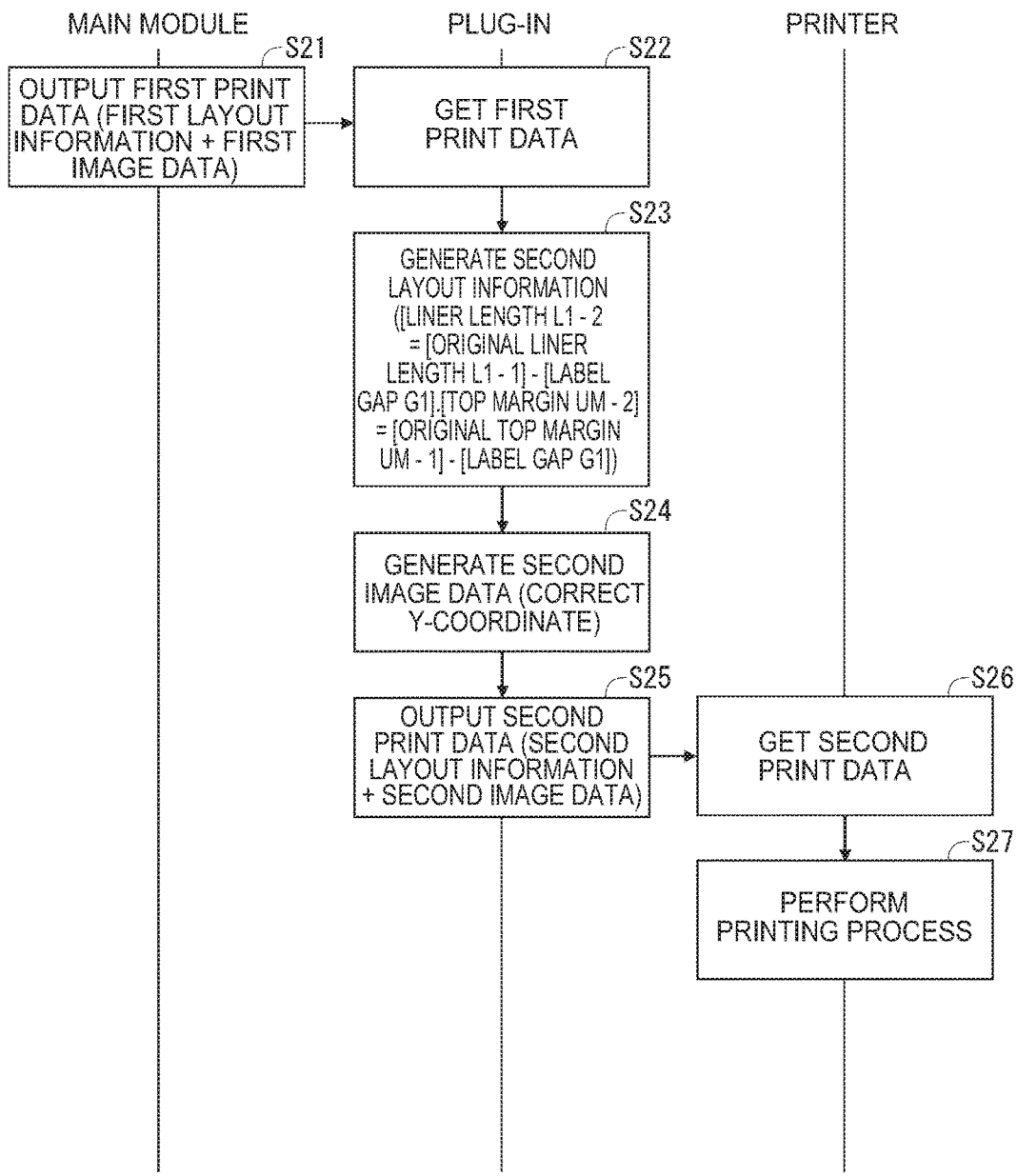
FIG. 10 is a flow chart showing the flow of a printing process according to a third embodiment of the invention.

FIG. 10 is a flow chart showing the flow of the printing process in this third embodiment of the invention. Steps S21, S22, S25-S27 are the same as steps S01, S02, S05-S07 of the first embodiment shown in FIG. 5. As shown in S23, the plug-in 22 generates the second layout information by correcting the liner length L1 and top margin UM by an equation not shown based on the acquired first layout information and the set label gap G1. The bottom margin DM is corrected together with the liner length L1 and top margin UM. As shown in S24, the plug-in 22 also corrects the y-coordinate of the first image data appropriately to the correction of the liner length L1 and top margin UM, and generates the second image data.

As described above, the third embodiment of the invention has the effect of the first embodiment and the effect of the second embodiment. More specifically, the user can intuitively adjust the print layout on the client terminal 1 while also preventing wasteful label 7 consumption due to the paper slipping.

Other Examples

Three embodiments of the invention are described above, and elements of the printing system SY (particularly the plug-in 22) described in the foregoing embodiments and examples may be provided as a computer-executable program. The program may also be provided stored on a recording medium, such as CD-ROM or flash memory. Yet further, a program (such as the plug-in 22) for causing a computer to function as parts of the printing system SY, and a recording medium storing the program, are also included in the scope of the invention.

Label roll paper 5 is used above as an example of a print medium that is used when the second mode is set, but the invention is not limited to label roll paper 5, and may be used with any print media that has unit print areas E1 disposed at an equal interval in the paper conveyance direction and is used to print to a target print area E3 inside each unit print area E1. The printer 3 in the foregoing embodiments executes the printing process when triggered by detecting the leading end of the unit print area E1 (detecting the leading end of a label 7), but the printing process may be triggered by detecting the trailing end of a unit print area E1 or other specific position of the unit print area E1.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A control method of a printer configured to print based on print data for a unit print area of a continuous print medium, the control method comprising:

determining whether to print in a first mode, in which printing is not based on a detection of a location on the print medium, or a second mode, in which printing is based on a detection of a location on the print medium; and acquiring first layout information that is contained in the print data and specifies a first relative location between a target print area and the unit print area in a conveyance direction of the print medium;

when the printer determines to print in the second mode, generating second layout information that specifies a second relative location between the target print area and the unit print area in the conveyance direction of the print medium, the second relative location being different from the first relative location, and printing in the target print area based on the second layout information; and when the printer determines to print in the first mode, printing based on the first layout information;

wherein the first layout information and the second layout information include a first margin length, which is a distance between a leading end of the unit print area and a leading end of the target print area, in the conveyance direction; and wherein the first margin length contained in the generated second layout information is shorter than the first margin length contained in the first layout information.

2. The control method of claim 1,
wherein the printer is a printer that is configured to print on label paper having labels disposed at a specific position in the unit print area;
wherein the control method further comprises determining a label gap, which is a length of a space in the conveyance direction between adjacent labels; and
wherein the second layout information is generated based on the acquired label gap.

3. The control method of claim 2, wherein the second layout information is generated by changing the position of the target print area with respect to the unit print area by ½ the label gap in the conveyance direction, relative to the first layout information, such that the second layout information specifies that a leading end of the unit print area in the conveyance direction coincides with a leading end of the label area in the conveyance direction.

4. The control method of claim 1, wherein:
the leading end of the unit print area and the leading end of the target print area are the same in the second layout information.

5. A non-transitory computer-readable recording medium on which a program is recorded for controlling a printer configured to print based on print data for a unit print area of a continuous print medium, the program comprising steps for:
determining whether to print in a first mode, in which printing is not based on a detection of a location on the print medium, or a second mode, in which printing is based on a detection of a location on the print medium; and
acquiring first layout information that is contained in the print data and specifies a first relative location between a target print area and the unit print area in a conveyance direction of the print medium;
when the printer determines to print in the second mode, generating second layout information that specifies a second relative location between the target print area and the unit print area in the conveyance direction of the print medium, the second relative location being different from the first relative location, and printing in the target print area based on the second layout information; and
when the printer determines to print in the first mode, printing based on the first layout information;
wherein the first layout information and the second layout information include a first margin length, which is a distance between a leading end of the unit print area and a leading end of the target print area, in the conveyance direction; and
wherein the first margin length contained in the generated second layout information is shorter than the first margin length contained in the first layout information.

6. A printer, comprising:
a printhead configured to print on a continuous print medium that is conveyable in a conveyance direction;
a detection unit configured to detect the print medium; and
a control unit configured to receive print data corresponding to a unit print area, control the printhead based on the received print data, and print to a target print area contained in the unit print area,
wherein the control unit is configured to perform steps of:
determining whether to print in a first mode, in which printing is not based on a detection of a location on the print medium, or a second mode, in which printing is based on a detection of a location on the print medium; and
acquiring first layout information that is contained in the print data and specifies a first relative location between a target print area and the unit print area in the conveyance direction of the print medium;
when the printer determines to print in the second mode, generating second layout information specifies a second relative location between the target print area and the unit print area in the conveyance direction of the print medium, the second relative location being different from the first relative location, and printing in the target print area based on the second layout information; and
when the printer determines to print in the first mode, printing based on the first layout information;
wherein the first layout information and the second layout information include a first margin length, which is a distance between a leading end of the unit print area and a leading end of the target print area, in the conveyance direction; and
wherein the first margin length contained in the generated second layout information is shorter than the first margin length contained in the first layout information.

* * * * *